United States Patent Office 3,473,215
Patented Oct. 21, 1969

3,473,215
WELDING OF TUBES TO TUBE PLATES
Alan Ernest Stevens, Wokingham, England, assignor to Foster Wheeler Corporation, New York, N.Y., a corporation of New York
Filed Nov. 17, 1966, Ser. No. 595,082
Int. Cl. B23k 31/02, 1/20
U.S. Cl. 29—483                             4 Claims

ABSTRACT OF THE DISCLOSURE

A method of welding a tube to a tube plate having a tube hole in the plate of a diameter equal to the inside diameter of the tube, a socket coaxial with the hole having a diameter equal to the outside diameter of the tube and a shallow groove extending coaxially around the socket wherein the tube is inserted in the socket, a first fusion weld is effected from the inside of the tube to weld the plate at its surface to the tube and a second fusion weld is effected from the inside and at the end of the tube to fuse the end of the tube with the material of the plate.

---

This invention relates to the welding of tubes to tube plates and headers (referred to herein generically as "plates").

Where tubes are connected to the plates at a close pitch, the thickness of the plates has to be very considerable if these are to be able to withstand any substantial pressure. In order to reduce the thickness as much as possible, the plates should be drilled to the inside diameter of the tubes and the latter be butt welded to them. This involves preparation of the plate if a good weld is to be obtained and the best form of preparation has been found to be the formation of stubs by machining the face of the plate.

Good butt welds can be obtained in this way, but the machining of the face of the plate involves the removal of a substantial amount of metal and is therefore an extensive operation. Moreover, it necessitates compensation by a substantial increase in the original thickness of the plate which, in the case in which the plate is made of a noncorrosive material such as stainless steel, leads to considerably increased expense.

The invention is concerned with minimising the increase in thickness of the tube plate or header consequent upon the weld preparation.

In accordance with the invention, there is provided a method of welding a tube to a plate as herein defined, comprising inserting the end of the tube as far as possible into a hole in the plate having the diameter of the outside of the tube for a short depth and the diameter of the inside of the tube for the remainder of its depth, and welding the tube to the plate from the inside with sufficient penetration to eliminate the inside and outside crevices between the tube and plate.

Preferably a shallow groove of an inside diameter a little greater than the outside diameter of a tube is cut in the face of the plate coaxially around the hole.

Welded joints made this way have the advantage that the weld preparation is simple and cheap to make. Also there is no necessity to machine away a substantial amount of the plate, and therefore the initial thickness of the plate does not have to be increased to compensate for this.

An example of a weld in accordance with the invention is illustrated in the accompanying drawings, in which.

Figure 1:
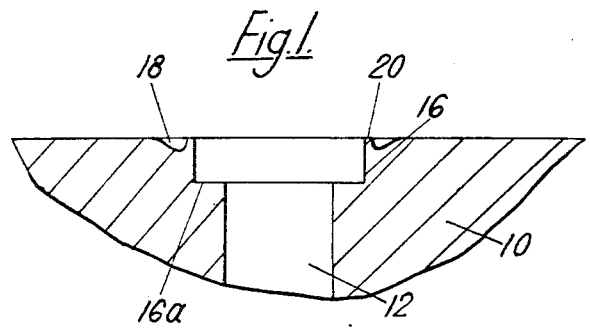
FIGURE 1 is a cross section through the weld preparation of the plate.
Figure 2:
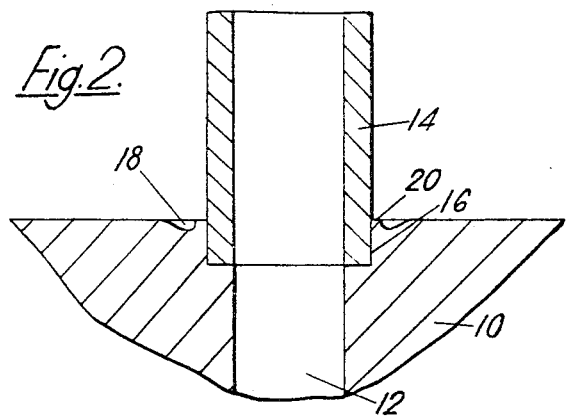
FIGURE 2 is a cross section showing the tube in position in the preparation.

The weld preparation made on the plate 10 is shown in FIGURE 1. A hole 12 having the same diameter as the inside diameter of the tube 14 to be welded to the plate is drilled through the plate and, at its upper end, the hole 12 is enlarged at 16 to the outside diameter of the tube 14. In the top face of the plate there is machined a shallow groove 18, whose inner diameter is slightly larger than the outside diameter of the tube 14, so that a thin annular rib 20 is left.

The tube 14 is then fitted in the plate 10 with the end of the tube extending into the enlargement 16, the end of the tube abutting the base 16a of the enlarged portion.

Figure 3:
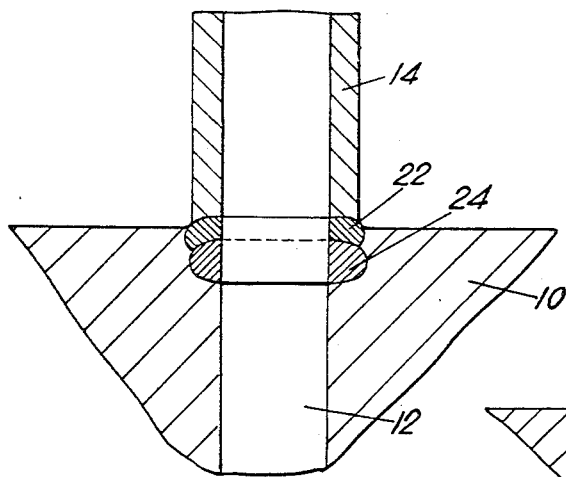
FIGURE 3 is a cross section through the finished joint.

The tube is then joined to the plate by welding effected from the inside using, for example, a torch of the kind described and claimed in Patent Nos. 913,207 and 934,485. The welding can be made in one run, but is preferably made in two runs as illustrated in FIGURE 3.

The first of these welding runs 22 is effected at the level of the rib 20 with sufficient penetration to ensure that the rib becomes completely incorporated into the weld and eliminates any crevice between the tube and the surface of the plate. The second run 24 is effected at the level of the end of the tube and of the base 16a with sufficient penetration to eliminate any crevice or space between tube and plate and so that the two runs merge.

The invention is intended to be used mainly in connection with heat exchangers and the like having tubes of not more than 1 inch inside diameter disposed at a pitch of not more than 1½ tube diameters. In a typical case, the tubes will be of ½ inch inside daimeter and be set at a pitch of ¾ inch. In that case, the depth of the enlargement 16 of the bores in the plate can be about ¾ inch, the depth of the groove 18 from ⅟₁₆ to ⅛ inch and the thickness of the rib 20 not more than ⅟₁₆ inch.

Figure 4:
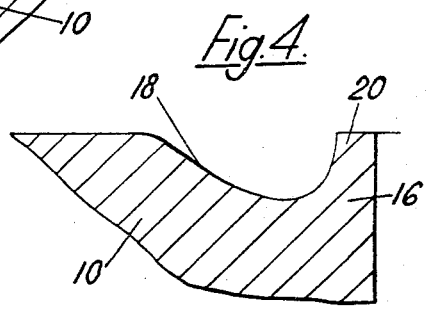
FIGURE 4 is an enlarged detail of the preparation shown in FIGURE 1.

If the shallow groove is shaped correctly, for example, by providing a groove which has a cross-section which is radiused as opposed to sharp edged as shown in FIGURE 4, the weld penetration will provide a substantially smooth surface with no significant notch effect, and the thickness of the tube plate does not have to be increased to compensate for the removal of metal resulting from the weld preparation. If some compensation has to be made, it need be only very small in comparison with the extra thickness of at least ¼ inch which has to be provided with the preparations commonly used today. Where the tube plate has to be of stainless steel or other expensive noncorrosive metal, this is a matter of quite considerable importance. The invention also has the advantage of minimising the amount of machining which has to be effected.

I claim:

1. A method of welding a tube to a plate comprising the steps of:
   forming a hole through the plate of the diameter of the inside of said tube;
   enlarging said hole for a short depth to form a socket concentric with said hole and of the diameter of the outside of said tube;
   inserting the end of said tube into said socket;
   forming a shallow groove in the face of said plate coaxially around the socket, the inside diameter of said groove being larger than the outside diameter of the tube; and,
   fusion welding said tube to said plate from within said hole with sufficient penetration to eliminate any crevices between said tube and said plate.

2. A method according to claim 1 in which a first fusion weld is effected from the inside at the level of the face of said plate to fuse said plate at its surface with said tube, and a second fusion weld is effected from the inside at the end of said tube to fuse the end of said tube with the material of said plate.

3. A method of welding a tube to a plate as herein defined comprising the steps of:

forming a hole through said plate of the diameter of the inside of said tube;

forming a socket of predetermined depth in one face of said plate coaxially around said hole, said socket having the diameter of the outside of said tube;

inserting said tube in said socket so that the end of said tube abuts the base of said socket;

making a first internal fusion weld at the level of said one face of said plate to fuse together said tube and said plate and avoid a crevice at the face of said plate; and making a second internal fusion weld at the base of said socket to fuse together the end of said tube and the base of said socket and avoid a crevice therebetween, the second weld partially overlapping the first weld.

4. A method according to claim 3 further comprising the step of forming a shallow groove in the said one face of the plate around the socket, the inside diameter of said groove being slightly larger than the outside diameter of the socket.

References Cited

UNITED STATES PATENTS

| | | | |
|---|---|---|---|
| 2,447,085 | 8/1948 | Odlum | 29—483 X |
| 2,867,036 | 1/1959 | Hovelmann | 29—483 X |
| 2,996,600 | 8/1961 | Gardner et al. | 29—483 X |
| 3,195,229 | 7/1965 | Culver | 29—483 X |

JOHN F. CAMPBELL, Primary Examiner

J. L. CLINE, Assistant Examiner

U.S. Cl. X.R.

29—479